(12) United States Patent
Ansari et al.

(10) Patent No.: US 8,169,955 B2
(45) Date of Patent: May 1, 2012

(54) SYSTEMS AND METHODS FOR ORTHOGONAL FREQUENCY DIVISION MULTIPLE ACCESS (OFDMA) COMMUNICATIONS OVER SATELLITE LINKS

(75) Inventors: Arif Ansari, Bethesda, MD (US);
Jean-Michel Bories, Toulouse (FR);
Michel Cohen, Paris (FR); Erwan Corbel, Toulouse (FR)

(73) Assignees: ATC Technologies, LLC, Reston, VA (US); Thales Alenia Space France, Toulouse Cedex (FR)

( * ) Notice: Subject to any disclaimer, the term of this patent is extended or adjusted under 35 U.S.C. 154(b) by 1098 days.

(21) Appl. No.: 11/759,549

(22) Filed: Jun. 7, 2007

(65) Prior Publication Data
US 2007/0293214 A1    Dec. 20, 2007

Related U.S. Application Data

(60) Provisional application No. 60/805,135, filed on Jun. 19, 2006.

(51) Int. Cl.
*H04W 4/00*    (2009.01)

(52) U.S. Cl. ......... 370/329; 370/208; 370/316; 455/427

(58) Field of Classification Search .................. 370/329, 370/316, 280; 455/427
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |

(Continued)

FOREIGN PATENT DOCUMENTS

EP    0 506 255 A2    9/1992

(Continued)

OTHER PUBLICATIONS

International Search Report and Written Opinion for International Application No. PCT/US2007/014131 mailed Mar. 14, 2008 (14 pages).

(Continued)

*Primary Examiner* — Charles Shedrick
(74) *Attorney, Agent, or Firm* — Myers Bigel Sibley & Sajovec

(57) ABSTRACT

Methods for controlling orthogonal frequency division multiple access (OFDMA) communications over satellite links. The methods include estimating a differential delay in a satellite spotbeam between a mean propagation delay in the spotbeam and a propagation delay between a user terminal in the spotbeam and a satellite, estimating an overlap between an OFDMA uplink frame and an OFDMA downlink frame as a result of the differential delay, and providing a guard band in the OFDMA uplink frame and/or the OFDMA downlink frame to reduce an overlap between remaining portions of the OFDMA uplink frame and the OFDMA downlink frame other than the guard band. Corresponding systems and devices are also disclosed.

68 Claims, 9 Drawing Sheets

U.S. PATENT DOCUMENTS

| | | | |
|---|---|---|---|
| 5,761,605 A | 6/1998 | Tawil et al. | |
| 5,765,098 A | 6/1998 | Bella | |
| 5,808,766 A * | 9/1998 | Van de Voorde et al. | 398/102 |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A * | 11/1999 | Mallinckrodt | 455/427 |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,366,566 B1 * | 4/2002 | Scott | 370/280 |
| 6,400,679 B1 * | 6/2002 | Suzuki | 370/208 |
| 6,418,147 B1 | 7/2002 | Wiedeman | |
| 6,449,461 B1 | 9/2002 | Otten | |
| 6,522,865 B1 | 2/2003 | Otten | |
| 6,567,383 B1 * | 5/2003 | Bohnke | 370/280 |
| 6,570,858 B1 * | 5/2003 | Emmons et al. | 370/321 |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,788,917 B1 * | 9/2004 | Refai et al. | 455/12.1 |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,012,949 B2 * | 3/2006 | Uesugi | 375/130 |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,149,526 B2 | 12/2006 | Karabinis et al. | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,295,807 B2 | 11/2007 | Karabinis | |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,558,568 B2 | 7/2009 | Karabinis | |
| 7,574,206 B2 | 8/2009 | Karabinis | |
| 7,577,400 B2 | 8/2009 | Karabinis et al. | |
| 7,587,171 B2 | 9/2009 | Evans et al. | |
| 7,593,691 B2 | 9/2009 | Karabinis | |
| 7,593,724 B2 | 9/2009 | Karabinis | |
| 7,593,725 B2 | 9/2009 | Karabinis | |
| 7,593,726 B2 | 9/2009 | Karabinis et al. | |
| 7,596,111 B2 | 9/2009 | Karabinis | |
| 7,599,656 B2 | 10/2009 | Karabinis | |
| 7,603,081 B2 | 10/2009 | Karabinis | |
| 7,603,117 B2 | 10/2009 | Karabinis | |
| 7,606,590 B2 | 10/2009 | Karabinis | |
| 7,609,666 B2 | 10/2009 | Karabinis | |
| 7,620,394 B2 | 11/2009 | Good et al. | |
| 7,623,859 B2 | 11/2009 | Karabinis | |
| 7,623,867 B2 | 11/2009 | Karabinis | |
| 7,627,285 B2 | 12/2009 | Karabinis | |
| 7,634,229 B2 | 12/2009 | Karabinis | |
| 7,634,234 B2 | 12/2009 | Karabinis | |
| 7,636,546 B2 | 12/2009 | Karabinis | |
| 7,636,566 B2 | 12/2009 | Karabinis | |
| 7,636,567 B2 | 12/2009 | Karabinis et al. | |
| 7,639,981 B2 | 12/2009 | Karabinis | |
| 7,653,348 B2 | 1/2010 | Karabinis | |
| 7,664,460 B2 | 2/2010 | Karabinis et al. | |
| 7,696,924 B2 | 4/2010 | Levin et al. | |
| 7,706,746 B2 | 4/2010 | Karabinis et al. | |
| 7,706,748 B2 | 4/2010 | Dutta | |
| 7,706,826 B2 | 4/2010 | Karabinis | |
| 7,738,837 B2 | 6/2010 | Karabinis | |
| 7,747,229 B2 | 6/2010 | Dutta | |
| 7,751,823 B2 | 7/2010 | Karabinis | |
| 7,756,490 B2 | 7/2010 | Karabinis | |
| 7,783,287 B2 | 8/2010 | Karabinis | |
| 7,792,069 B2 | 9/2010 | Karabinis | |
| 7,792,488 B2 | 9/2010 | Karabinis et al. | |
| 7,796,985 B2 | 9/2010 | Karabinis | |
| 7,796,986 B2 | 9/2010 | Karabinis | |
| 7,801,520 B2 | 9/2010 | Karabinis | |
| 7,813,700 B2 | 10/2010 | Zheng et al. | |
| 7,817,967 B2 | 10/2010 | Karabinis et al. | |
| 7,831,201 B2 | 11/2010 | Karabinis | |
| 7,831,202 B2 | 11/2010 | Karabinis | |
| 7,831,251 B2 | 11/2010 | Karabinis et al. | |
| 7,856,211 B2 | 12/2010 | Karabinis | |
| 7,890,097 B2 | 2/2011 | Karabinis | |
| RE42,261 E | 3/2011 | Karabinis | |
| 7,907,893 B2 | 3/2011 | Karabinis et al. | |
| 7,917,135 B2 | 3/2011 | Karabinis | |
| 2002/0021715 A1 * | 2/2002 | Matheus et al. | 370/480 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0016731 A1 * | 1/2003 | Uesugi | 375/130 |
| 2003/0149986 A1 | 8/2003 | Mayfield et al. | |
| 2004/0066312 A1 * | 4/2004 | Hoctor et al. | 340/870.07 |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0203393 A1 | 10/2004 | Chen | |
| 2004/0235419 A1 * | 11/2004 | Michel | 455/12.1 |
| 2004/0240525 A1 | 12/2004 | Karabinis et al. | |
| 2005/0025093 A1 * | 2/2005 | Yun et al. | 370/328 |
| 2005/0041619 A1 | 2/2005 | Karabinis et al. | |
| 2005/0090256 A1 | 4/2005 | Dutta | |
| 2005/0111406 A1 * | 5/2005 | Pasanen et al. | 370/329 |
| 2005/0118948 A1 | 6/2005 | Karabinis et al. | |
| 2005/0136836 A1 | 6/2005 | Karabinis et al. | |

| | | |
|---|---|---|
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0227618 A1 | 10/2005 | Karabinis et al. |
| 2005/0239399 A1 | 10/2005 | Karabinis |
| 2005/0260947 A1 | 11/2005 | Karabinis et al. |
| 2005/0260984 A1 | 11/2005 | Karabinis |
| 2005/0272369 A1 | 12/2005 | Karabinis et al. |
| 2005/0286406 A1* | 12/2005 | Jeon et al. ............ 370/208 |
| 2005/0286449 A1* | 12/2005 | Seo et al. ............. 370/280 |
| 2006/0040613 A1 | 2/2006 | Karabinis et al. |
| 2006/0050625 A1* | 3/2006 | Krasner ............... 370/208 |
| 2006/0094420 A1 | 5/2006 | Karabinis |
| 2006/0135058 A1 | 6/2006 | Karabinis |
| 2006/0135070 A1 | 6/2006 | Karabinis |
| 2006/0165120 A1 | 7/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0246838 A1 | 11/2006 | Karabinis |
| 2006/0252368 A1 | 11/2006 | Karabinis |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1* | 12/2007 | Ansari et al. .......... 455/427 |
| 2007/0297323 A1* | 12/2007 | Seki ................... 370/208 |
| 2008/0008264 A1 | 1/2008 | Zheng |
| 2008/0032671 A1 | 2/2008 | Karabinis |
| 2008/0070586 A1* | 3/2008 | Kermoal et al. ........ 455/452.2 |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |
| 2011/0103273 A1 | 5/2011 | Dutta |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 95/34138 A | 12/1995 |
| WO | WO 01/54314 A1 | 7/2001 |

OTHER PUBLICATIONS

Karabinis et al. "Downlink and Uplink Synchronization Concepts for Spread Spectrum Communications Via Satellite" Raytheon Company, Equipment Division pp. 470-477 (1989).

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, vol. 4, 1998, pp. 189-198.

* cited by examiner

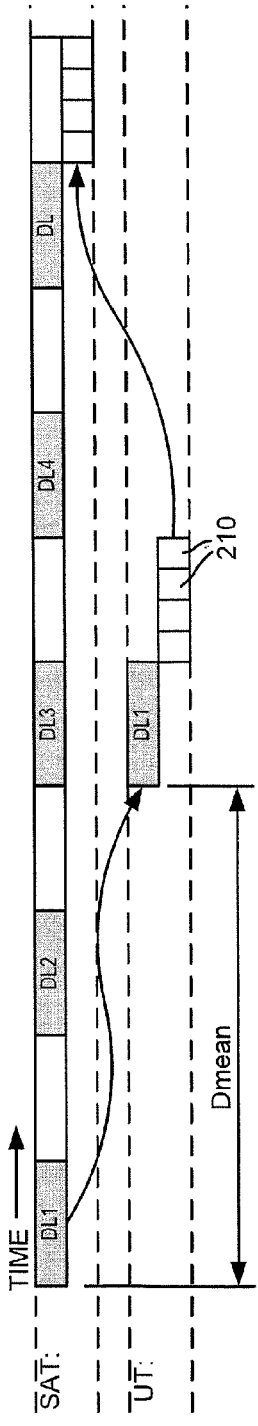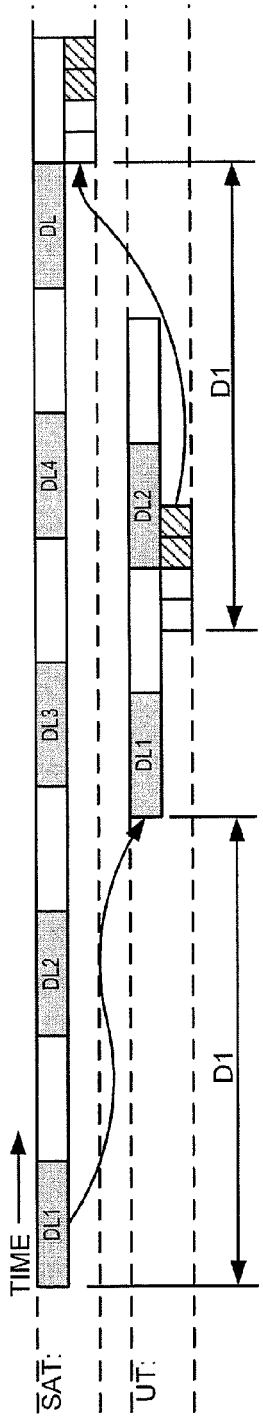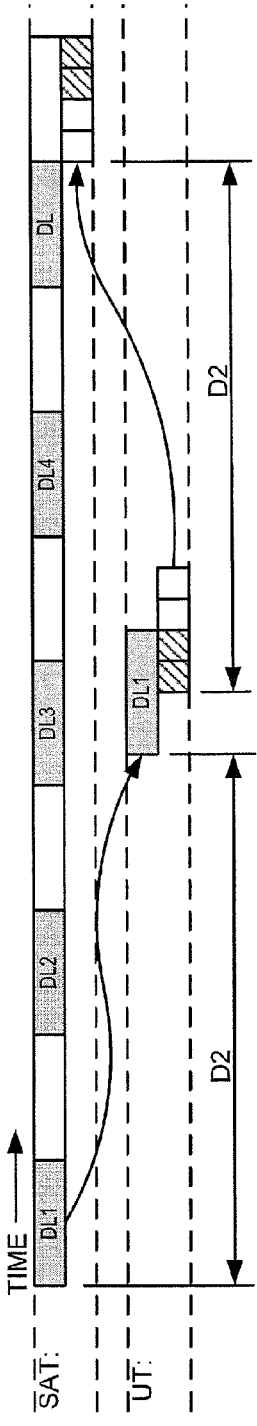

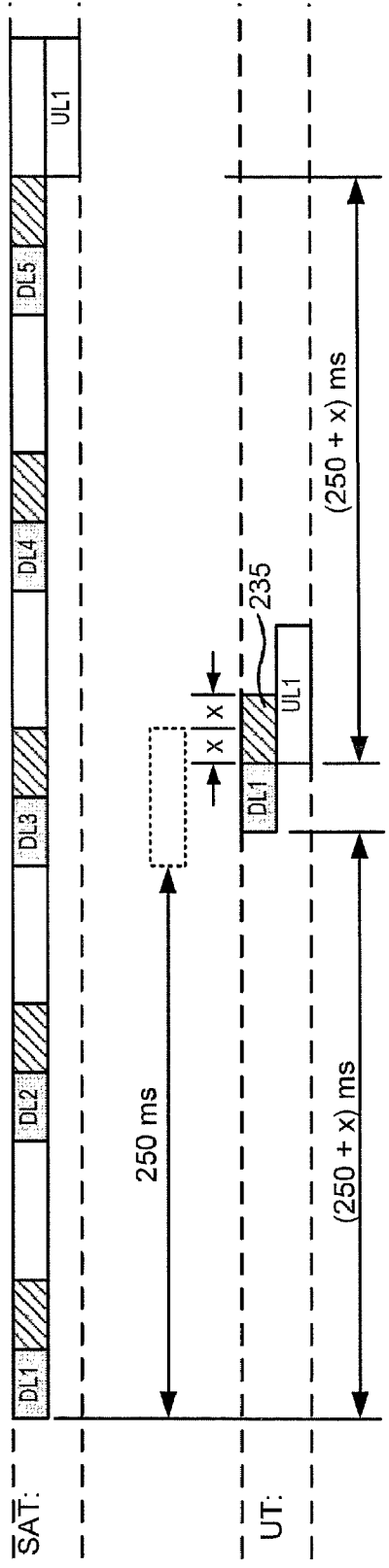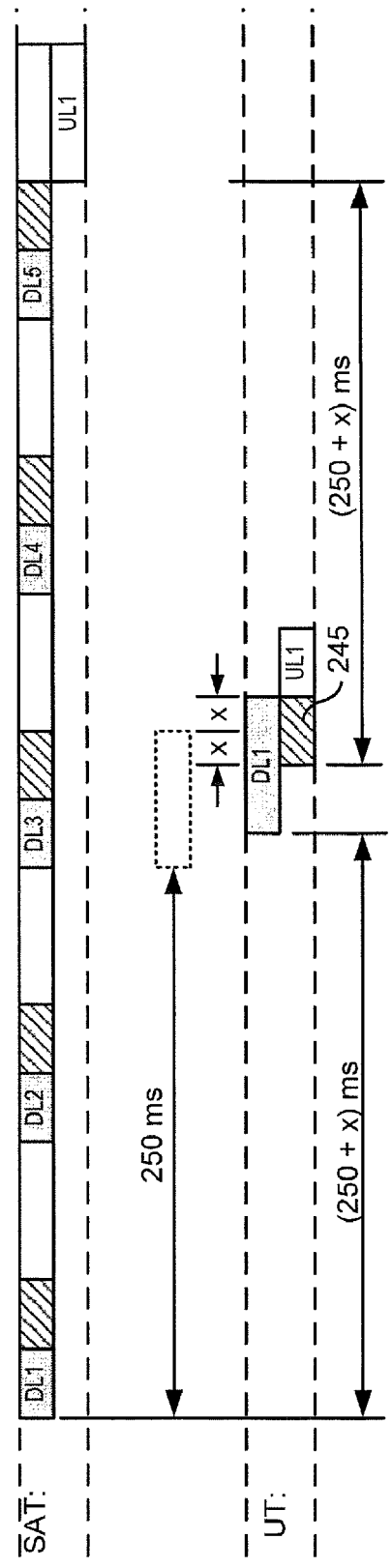

SYSTEMS AND METHODS FOR ORTHOGONAL FREQUENCY DIVISION MULTIPLE ACCESS (OFDMA) COMMUNICATIONS OVER SATELLITE LINKS

CROSS-REFERENCE TO RELATED APPLICATION AND CLAIM OF PRIORITY

This application claims the benefit of and priority to U.S. Provisional Patent Application No. 60/805,135, filed Jun. 19, 2006, the disclosure of which is hereby incorporated herein by reference as if set forth in its entirety.

BACKGROUND

This invention relates to wireless communications systems and methods, and more particularly to satellite radiotelephone communications systems and methods.

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal," a "mobile terminal," a "user terminal," or simply as a "terminal." As used herein, the term(s) "radioterminal," "radiotelephone," "mobile terminal," "user terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location (s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude. Finally, as used herein, an "earth station" includes a satellite gateway and/or other terrestrial elements of the satellite communications system, aside from the user terminal.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/ commercial areas. As a result, the overall system may become more economically viable, as it may be able to serve more effectively and reliably a larger subscriber base.

One example of terrestrial reuse of satellite frequencies is described in U.S. Pat. No. 5,937,332 to inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some frequencies of a satellite frequency band and using substantially the same air interface for both terrestrial and satellite communications may be more cost effective and/or aesthetically appealing compared to other alternatives. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Orthogonal Frequency Division Multiplexing (OFDM) and Orthogonal Frequency Division Multiple Access (OFDMA) based communications between user terminals and a terrestrial base station have been described in IEEE P802.16e/D7: Air Interface for Fixed and Mobile Broadband Wireless Access Systems and IEEE Std 802.16-2004: Air Interface for Fixed Broadband Wireless Access Systems. The methods contained in these standards include protocols applicable to terrestrial systems for allocating OFDM and OFDMA resources to user terminals and base stations for uplink and downlink communications, methods for synchronizing uplink and downlink frames at the user terminal and base stations so that they do not overlap in time (applicable to Time Division Duplexing (TDD) and Half Frequency Division Duplexing (HFDD) modes), and methods for synchronizing all sets of tones comprising an OFDMA channel arriving from different user terminals at a base station. In a TDD system, communicating terminals use a common channel, but transmit and receive at different times. HFDD is similar to TDD, in that terminals transmit and receive at different times. However, in HFDD, a terminal uses different frequencies for transmitting and receiving.

SUMMARY

Some embodiments of the invention provide methods for controlling orthogonal frequency division multiple access (OFDMA) communications over satellite links. The methods include estimating a differential delay in a satellite spotbeam between a mean propagation delay in the spotbeam and a propagation delay between a user terminal in the spotbeam and a satellite, estimating an overlap between an OFDMA uplink frame and an OFDMA downlink frame as a result of the differential delay, and providing a guard band in the OFDMA uplink frame and/or the OFDMA downlink frame to reduce an overlap between remaining portions of the OFDMA uplink frame and the OFDMA downlink frame other than the guard band.

The guard band may have a duration that is at least twice the differential delay. The propagation delay between the user terminal and the satellite may be less than the mean propagation delay, and providing the guard band may include providing the guard band at an end portion of the OFDMA uplink frame and/or at a beginning portion of the OFDMA downlink frame.

Providing the guard band may include providing a first guard band at the end portion of the OFDMA uplink frame and providing a second guard band at the beginning portion of the OFDMA downlink frame. The first guard band and the second guard band may have a total duration that is at least twice the differential delay.

The propagation delay between the user terminal and the satellite may be greater than the mean propagation delay, and providing the guard band may include providing the guard band at a beginning portion of the OFDMA uplink frame and/or at an end portion of the OFDMA downlink frame.

Providing the guard band may include providing a first guard band at the beginning portion of the OFDMA uplink frame and providing a second guard band at the end portion of the OFDMA downlink frame. The first guard band and the second guard band have a total duration that is at least twice the differential delay.

The OFDMA uplink frame may include a plurality of subregions, and providing a guard band in the OFDMA uplink frame may include designating at least one of the plurality of subregions as unused. A subregion may include a plurality of symbols in an OFDMA subchannel, and the subregion may include at least one pilot symbol. The subregion may include at least two data symbols.

The propagation delay between the user terminal and the satellite may be less than the mean propagation delay, and providing the guard band may include designating at least one subregion at an end portion of the OFDMA uplink frame and/or at a beginning portion of the OFDMA downlink frame as unused.

Providing the guard band may include designating at least one subregion at the end portion of the OFDMA uplink frame and at least one subregion at the beginning portion of the OFDMA downlink frame as unused.

The propagation delay between the user terminal and the satellite may be greater than the mean propagation delay, and providing the guard band may include designating at least one subregion at a beginning portion of the OFDMA uplink frame and/or at an end portion of the OFDMA downlink frame as unused.

Providing the guard band may include designating at least one subregion at the beginning portion of the OFDMA uplink frame and at least one subregion at the end portion of the OFDMA downlink frame as unused.

Estimating the differential delay may include defining a ranging window that has a duration of at least a duration of an OFDMA uplink frame plus twice a maximum expected differential delay for OFDMA uplink frames, and receiving a ranging codeword within the ranging window. The ranging codeword may include a plurality of ranging symbols and/or may be spread over a plurality of OFDMA subchannels.

The methods may further include transmitting a ranging response in response to the ranging code word, the ranging response designates a timing delay for use in synchronizing uplink transmissions. The ranging response may designate guardband(s) to be used on uplink and/or OFDMA downlink frames and/or designates at least one subregion of an OFDMA uplink frame and/or an OFDMA downlink frame as unused.

A system for controlling orthogonal frequency division multiple access (OFDMA) communications over satellite links according to some embodiments of the invention includes a satellite, a user terminal configured to communicate with the satellite via a satellite frequency over one of the satellite links, and a scheduler. The scheduler is configured to estimate a differential delay in a satellite spotbeam between a mean propagation delay in the spotbeam and a propagation delay between the user terminal in the spotbeam and the satellite, configured to estimate an overlap between an OFDMA uplink frame and an OFDMA downlink frame as a result of the differential delay, and configured to provide a guard band in the OFDMA uplink frame and/or the OFDMA downlink frame to reduce an overlap at the user terminal between remaining portions of the OFDMA uplink frame and the OFDMA downlink frame other than the guard band.

Some embodiments of the invention provide a scheduler for controlling orthogonal frequency division multiple access (OFDMA) communications over satellite links between a satellite and a user terminal. The scheduler is configured to estimate a differential delay in a satellite spotbeam between a mean propagation delay in the spotbeam and a propagation delay between the user terminal in the spotbeam and the satellite, configured to estimate an overlap between an OFDMA uplink frame and an OFDMA downlink frame as a result of the differential delay, and configured to provide a guard band in the OFDMA uplink frame and/or the OFDMA downlink frame to reduce an overlap at the user terminal between remaining portions of the OFDMA uplink frame and the OFDMA downlink frame other than the guard band.

Some embodiments of the invention provide a radioterminal configured to communicate with a satellite using orthogonal frequency division multiple access (OFDMA) communications, the radioterminal is configured to receive a designation of a guardband to be used for an OFDMA uplink frame transmitted by the radioterminal to the satellite, and the radioterminal is configured not to transmit OFDMA signals during the uplink guardband so as to reduce an overlap between the OFDMA uplink frame and an OFDMA downlink frame.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIGS. 2A and 2B show exemplary symbol structures for resource allocation in accordance with some embodiments of the invention.

FIGS. 4A-4C illustrate an uplink allocation according to some embodiments of the invention in differential delay situations such as those depicted in FIG. 3A-3C.

FIGS. 5A-5G show uplink and downlink frame synchronization according to some embodiments of the invention for terminals with various propagation delays.

DETAILED DESCRIPTION OF EMBODIMENTS OF THE INVENTION

Figure 1A:
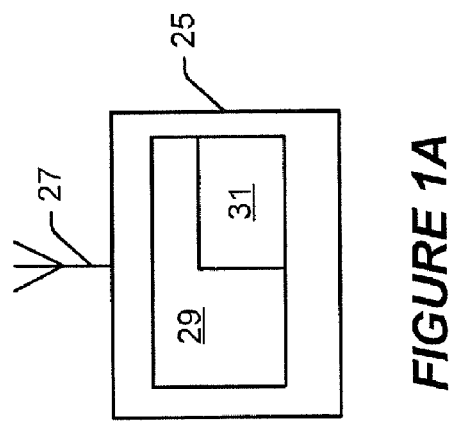
FIG. 1A is a schematic illustration of a satellite according to some embodiments of the invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The symbol "/" is also used as a shorthand notation for "and/or".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention.

Moreover, as used herein, "substantially the same" band(s) means that two or more bands being compared substantially overlap in frequency, but that there may be some areas of non-overlap, for example at a band end(s) and/or elsewhere. "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications. As used herein, the term "narrow-band" relates to a comparison between two signals. A first signal may be called "narrow-band" relative to a second signal if a bandwidth associated with the first signal is significantly less compared to a bandwidth associated with the second signal (e.g., the bandwidth of the first signal is approximately one order of magnitude less than the bandwidth of the second signal). For example, a signal having a bandwidth of 200 kHz may be called narrow-band compared to a signal having a bandwidth of 1.25 MHz.

Some embodiments of the invention may arise from recognition that in the OFDM/OFDMA standards IEEE P802.16e and IEEE Std 802.16-2004, only terrestrial systems and methods are considered. Accordingly, the standards may not adequately address systems including satellite communications elements, which may experience effects, such as noise, delay, attenuation, etc., that may be different from those experienced by terrestrial systems and methods.

In an OFDMA system, the available bandwidth is divided into orthogonal tones, or carrier frequencies. Each user is allocated a set of orthogonal tones for use in communicating with a base station. In a satellite-based system using OFDMA, the allocated set of tones may be relatively small, due to power and/or bandwidth constraints.

In a terrestrial OFDMA system, resource allocation typically consists of subchannels (or sets) of 4 tones each. Frame synchronization in time division duplexing (TDD) mode may be accomplished easily in a terrestrial system, since the propagation delays are relatively very small and the differential delays may be considered inconsequential. Thus, the synchronization of the uplink sets of tones may be achieved through a small window of adjustment, since the differential delays are small. Synchronization may be aided by the use of ranging codes that are sent downlink to the user terminals. Responses to the ranging code permit the base station to determine the distance of the user terminal, and thus the delay associated with the user terminal, from the base station. The relatively large available bandwidth in a terrestrial communication system allows the ranging code to be accommodated within a short period of time. In contrast, according to some embodiments of the invention, the relatively restricted power and bandwidth on satellite channels and increased propagation and differential delays may make it desirable to change the resource allocation systems and methods, and/or synchronization and ranging methods.

Terrestrial reuse of satellite frequencies, as authorized by the Federal Communications Commission's Ancillary Terrestrial Component (ATC) Order, FCC 03-15, allows the same user terminal to communicate with the terrestrial base stations and with satellites and associated earth stations. The FCC Order stipulates transparency and "safe-harbor" clauses, so that dual mode satellite and terrestrial user terminals can operate over hybrid satellite-ATC networks. To develop efficient dual-mode user devices, the satellite mode protocol should be adapted from and be closely related to the terrestrial mode protocol.

Satellite channels may impose power and bandwidth constraints, and generally have increased propagation delay between user terminals and earth stations and increased differential delays between the earth station and any two user terminals when compared to terrestrial channels. According to some embodiments of the invention, a wireless communication protocol for satellite channels that may be adapted from a terrestrial protocol may account for these constraints and/or delays. For an OFDMA based protocol, some embodiments of the invention can change the power, bandwidth and/or delay of an uplink signal, which may impact aspects of the protocol such as resource allocation, synchronization of uplink and downlink frames, synchronization of uplink sets of OFDMA tones and/or allocation of uplink resources as small as a single subcarrier.

Some embodiments of the present invention provide methods and systems for allocating OFDMA resources to user terminals and earth stations in the form of tones carrying user data and tones carrying pilot information for control purposes, in a manner conducive to the power and bandwidth characteristics of satellite channels and the comparatively slow variation of the satellite channel. These characteristics may allow the allocation of a small number of tones for communication to and from one user terminal. Moreover, the nature of the channel variation may allow allocation of a large number of symbols (e.g., 8) for each pilot symbol in each allocation. This is because the pilot symbols are primarily used for channel quality measurements. Since the satellite channel is slow-varying relative to a terrestrial channel, the pilots may be needed less frequently to monitor the changing quality of the channel.

In other embodiments of the present invention, a scheduler of uplink resources in a Half Frequency Division Duplexing (HFDD) mode system residing at the satellite and/or earth station synchronizes the downlink and uplink frames according to a timing reference at the satellite/earth station so that the uplink and downlink frames may not overlap at the user terminal and/or the earth station. That is, the downlink and uplink frames may be synchronized so that, for example, a user terminal is not required to simultaneously transmit an uplink frame and receive a downlink frame or any portion thereof.

According to some embodiments, an uplink scheduler determines the portions of the uplink frame that do not overlap with the downlink frame and populates these portions with uplink data. The overlapped portions of the uplink frame may not be used for data transmission. According to other embodiments of the present invention, the uplink scheduler determines an amount of advance or retardation of the transmission epoch of the uplink frame as a function of the terminal's differential delay offset from a mean propagation delay. The amount of advance or retardation is communicated to the user terminal, which can appropriately advance or delay its transmitted uplink signal to cause the uplink signal to arrive at the satellite/earth station at the appropriate epoch.

In yet other embodiments of the present invention, the user terminal uses a small portion of the uplink bandwidth over a time period comprising a number of symbol periods to transmit a ranging code to the satellite/earth station identifying its position in terms of its differential delay relative to the mean propagation delay. The satellite/earth station in turn uses a ranging window sized to accommodate a maximum expected differential advance/delay of user terminals, starting at a known epoch in the uplink frame. The ranging window is used to capture the ranging code. In response to determining the range of the user terminal, the satellite/earth station requests the user terminal to advance or retard its uplink transmission accordingly.

Some embodiments of the invention include systems/methods for allocating resources in bandwidth and time for OFDMA communication between a user terminal and an earth station via a satellite. In particular, one or more orthogonal tones may be allocated over many symbol periods. The symbol periods may be used or not used by the user terminal and/or the earth station depending on whether or not the symbol periods overlap other symbol periods.

Figure 1:
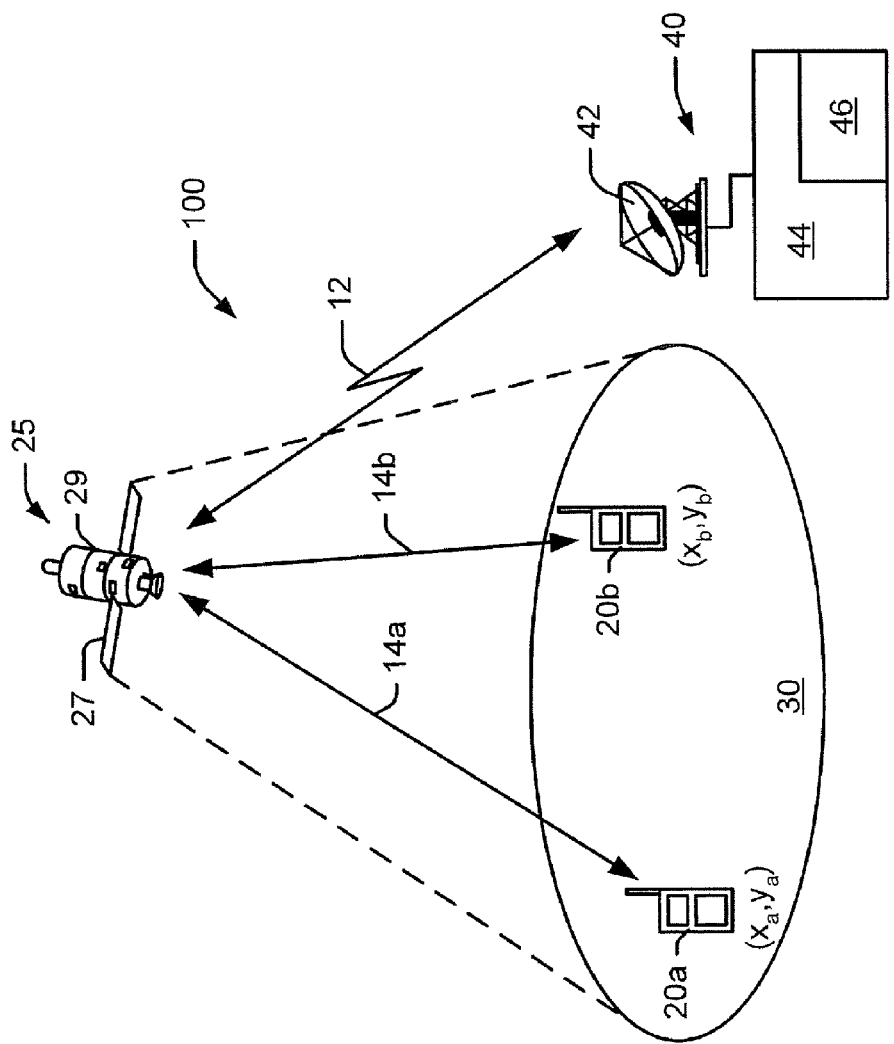
FIG. 1 is a schematic illustration of satellite systems/methods according to embodiments of the invention.

A system 100 according to some embodiments of the invention is illustrated in FIG. 1. As shown therein, a first user terminal 20a has geographic coordinates $(x_a, y_a)$. The first user terminal 20a is located within a cell 30 within a geographic footprint of a satellite 25, which may be a low-earth orbiting satellite (LEO), a medium-earth orbiting satellite (MEO), and/or a geostationary satellite. The satellite 25, which includes an antenna 27 and an electronics system 29, communicates with at least one earth station 40, which includes an antenna 42 and an electronics system 44, via a feeder link 12. The electronics system 44 of the earth station 40 may include a resource scheduler 46 that is configured to provide synchronization and/or ranging functions as described in more detail below. The satellite antenna 27 may include an array of antenna feed elements (not shown), which generate signals covering respective overlapping geographic areas in the geographic footprint of the satellite 25. The first user terminal 20a communicates with the satellite 25 via a satellite communications link 14a.

A second user terminal 20b is located within the cell 30 at geographic coordinates $(x_b, y_b)$, and communicates with the satellite 25 via a second satellite communications link 14b. Because the cell 30 may be relatively large compared to cells of terrestrial (land-based) communications systems, the path length of the communication link 14a between the first user terminal 20a and the satellite 25 may be significantly different from the path length of the communication link 14b between the second user terminal 20b and the satellite 25. As a consequence, a satellite transmission delay associated with the first user terminal 20a may be significantly different from the transmission delay associated with the second user terminal 20b.

FIG. 1A is a block diagram of a satellite 25 according to some embodiments of the invention. The satellite 25 includes an antenna 27 and an electronics system 29. The electronics system 29 of the satellite 25 may include a resource scheduler 31 that is configured to perform synchronization and/or ranging functions as described in more detail below in addition to or instead of a resource scheduler 46 in the earth station 40. Accordingly, synchronization and/or ranging techniques for satellite communication according to some embodiments of the invention may be provided by functionality in a satellite 25 and/or in an earth station 40.

Figures 2A, 2B:
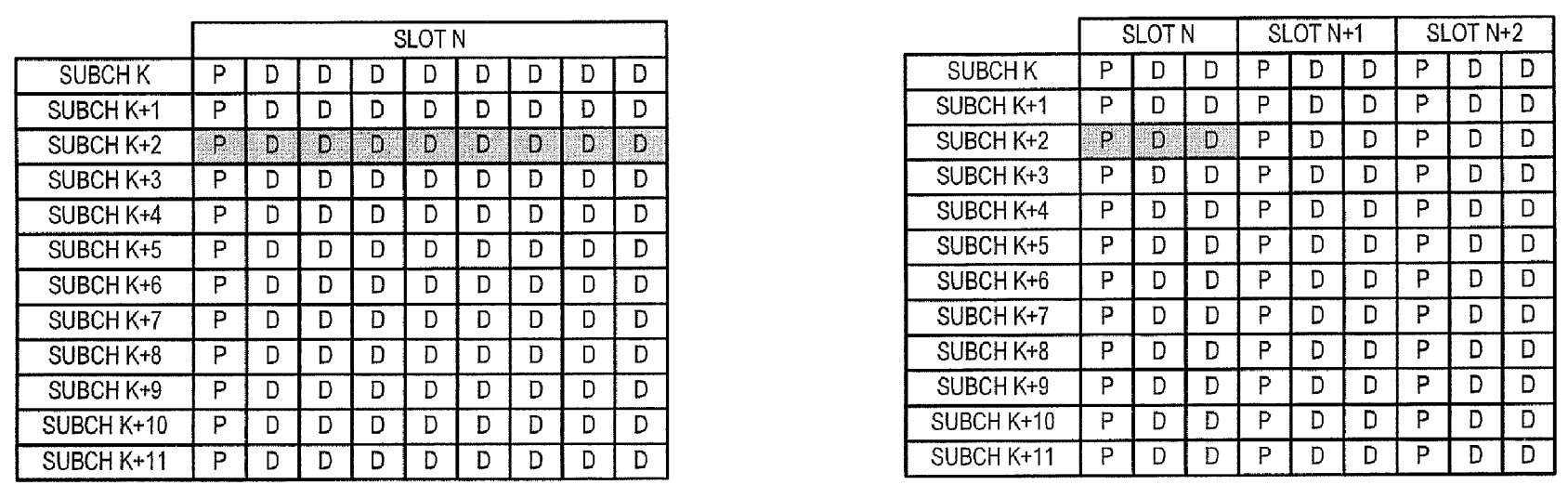

FIGS. 2A and 2B show exemplary symbol structures for resource allocation in accordance with some embodiments of the invention. In particular, FIGS. 2A and 2B shows embodiments of systems/methods, in which each subchannel includes a single tone (or subcarrier). Each user terminal to satellite/earth station communication link in either direction (uplink or downlink) can be allocated a slot including one or more subchannels, and each slot may span a number of symbols. For example, as illustrated in FIG. 2A, a slot may include 9 symbols, one of which is reserved for pilot signals ("P"). The remaining eight symbols may be used for data ("D"). In some embodiments, as illustrated in FIG. 2B, slots may be assigned with more granularity. For example, a slot may include three symbols, with one symbol used for pilot signals ("P") and two symbols used for data ("D").

According to some embodiments of the invention, systems/methods to synchronize the uplink (user terminal to earth station) and downlink (earth station to user terminal) data frames over an HFDD communication link via a satellite are provided. In some embodiments, the synchronization is performed to identify and permit a user terminal to use periods of time for uplink data that do not overlap with downlink frames, so that a user terminal may not be required to both transmit an uplink signal and receive a downlink signal at the same time.

Figure 3A:
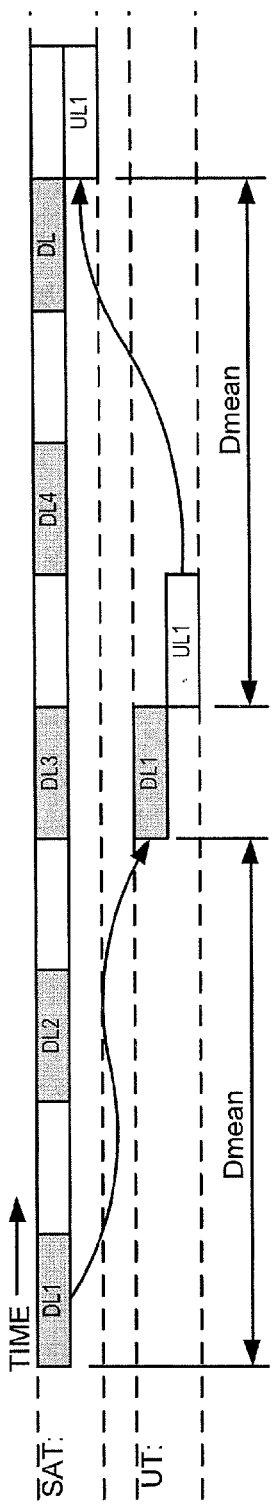
FIGS. 3A-3C show some potential effects of large differential delays in satellite channels on the frame synchronization at the user terminal.
Figure 3B:
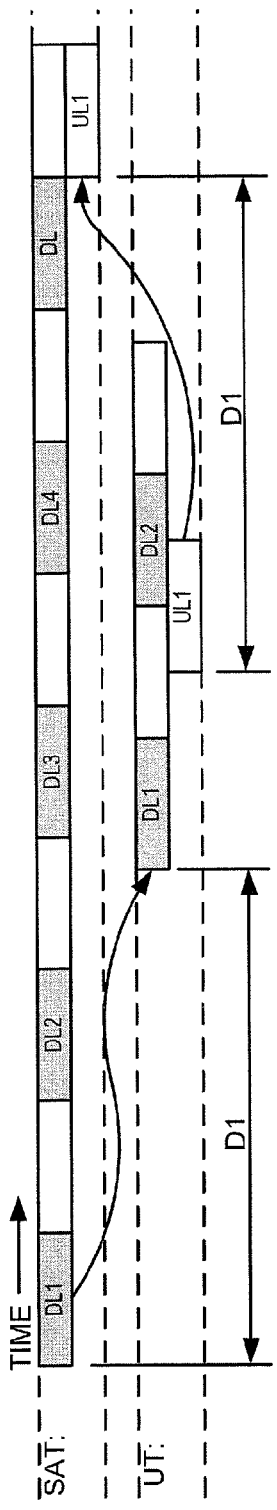
Figure 3C:
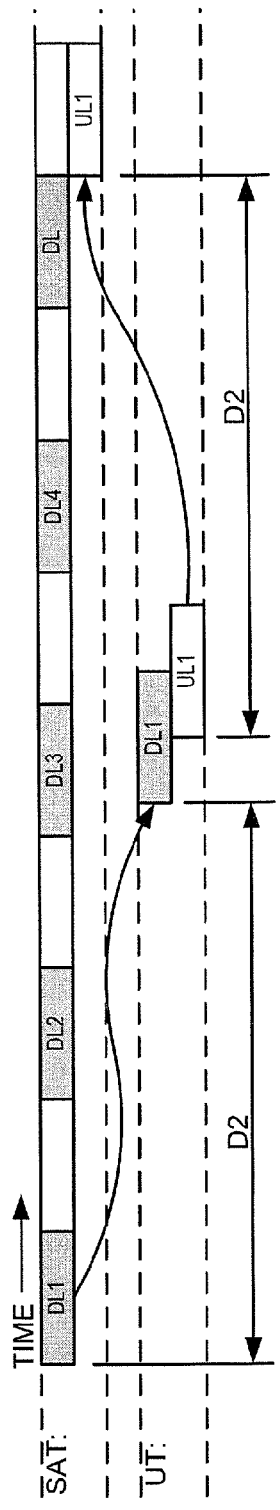

FIGS. 3A-3C show some potential effects of large differential delays in satellite channels on frame synchronization at the user terminal. Frames are synchronized for a mean propagation delay, but may be retarded to account for lower delays and/or advanced to account for larger delays due to the varying differential delays of user terminals in a satellite frequency band (spot beam).

In particular, FIGS. 3A-3C show the impact of large differential delays around the mean delay on the uplink and downlink frame synchronization in a Half Frequency Division Duplexing mode. In FIGS. 3A-3C, downlink subframes DL1, DL2, etc., are sent by a satellite/earth station (SAT) to a user terminal (UT). Uplink subframes, including uplink subframe UL1, are sent by the user terminal to the satellite/earth station. If all the user terminals experienced relatively the same measurable propagation delay, as may occur in conventional terrestrial networks, then the uplink and downlink frames would be synchronized, i.e., there would be no overlap between the uplink and the downlink subframes at the user terminal as depicted by the mean propagation delay timeline in FIG. 3A. In FIG. 3A, the downlink subframe DL1 is received by the user terminal after a transmission delay of Dmean. After receiving the downlink subframe DL1, the user terminal UT sends the uplink subframe UL1, which arrives at the satellite/earth station at the appropriate epoch following the transmission delay Dmean.

In satellite networks, due to the large geographical area covered by a spot beam, user terminals in the spot beam may experience significant differential delays around this mean delay. That is, signals from some user terminals may have transmission delays that are measurably longer than the mean transmission delay, while signals from other user terminals may have transmission delays that are measurably shorter than the mean transmission delay. As a result, the uplink and downlink subframes may overlap each other at the user terminal as shown in FIGS. 3B and 3C.

For example, referring to FIG. 3B, the downlink subframes DL1 and DL2 are received by the user terminal after a transmission delay D1, which is shorter than the mean transmission delay Dmean. After receiving the downlink subframe DL1, the user terminal UT sends the uplink subframe UL1. However, due to the differential transmission delay, in order to send the uplink subframe UL1 far enough in advance to ensure that it arrives at the satellite/earth station at the appropriate epoch, the uplink subframe UL1 would overlap the next incoming downlink subframe DL2 at the user terminal.

In the example illustrated in FIG. 3C, the downlink subframes DL1 and DL2 are received by the user terminal after a transmission delay D2, which is longer than the mean transmission delay Dmean. In the example illustrated in FIG. 3C, in order to send the uplink subframe UL1 far enough in advance to ensure that it arrives at the satellite/earth station at the appropriate epoch, the uplink subframe UL1 would overlap the incoming downlink subframe DL1 at the user terminal.

FIGS. 4A-4C illustrate uplink allocations according to some embodiments of the invention in differential delay situations such as those illustrated in FIGS. 3A-3C. In particular, FIGS. 4A-4C depict how some embodiments of the invention can address overlapping uplink and downlink subframes. The uplink subframe is divided into subregions. A resource scheduler in the satellite/earth station, which has knowledge of the positions of all of the user terminals, and their associated propagation delays, allocates uplink resources on a subregion by subregion basis, so that the user terminal does not transmit while receiving on the downlink.

For example, in the embodiments illustrated in FIGS. 4A-4C, each uplink subframe is divided in to a plurality of subregions 210. Each subregion 210 may include at least one slot including at least one pilot symbol, as illustrated in FIGS. 2A and 2B. In the embodiments illustrated in FIGS. 4A-4C, some of the subregions 210 may be unused, so that data may be contained in less than all of the subregions of an uplink subframe to avoid having overlapping uplink and downlink subframes at the user terminal.

For user terminals having the mean propagation delay, data may be carried in any of the subregions 210, as shown in FIG. 4A. Referring to FIG. 4B, for low differential delays (e.g., propagation delays less than the mean propagation delay), the subregions 210 carrying data are in the initial part of the subframe, while the subregions 210 that would otherwise overlap a downlink subframe DL2 are not used.

As shown in FIG. 4C, for longer differential delays (e.g., propagation delays greater than the mean propagation delay), data may be carried in subregions 210 in the latter part of the subframe, while the other subregions 210 are not used.

The embodiments described above in connection with FIGS. 4A-4C can achieve synchronization of the uplink frames without the need for intelligence overhead. However, resources may be wasted since synchronization is achieved through repetition and/or nonuse of some portions of an uplink subframe.

Some embodiments of the invention may reduce wastage of resources, but may require the addition of intelligence/ processing complexity that may affect the delay and/or overhead associated with the communications. In particular, FIGS. 5A-5C illustrate embodiments of the invention in which synchronization of user terminals' transmissions includes advancing or retarding the transmission time of the uplink subframe and the user of appropriately sized guardbands so that it does not substantially overlap with the downlink subframe.

Figure 5A:
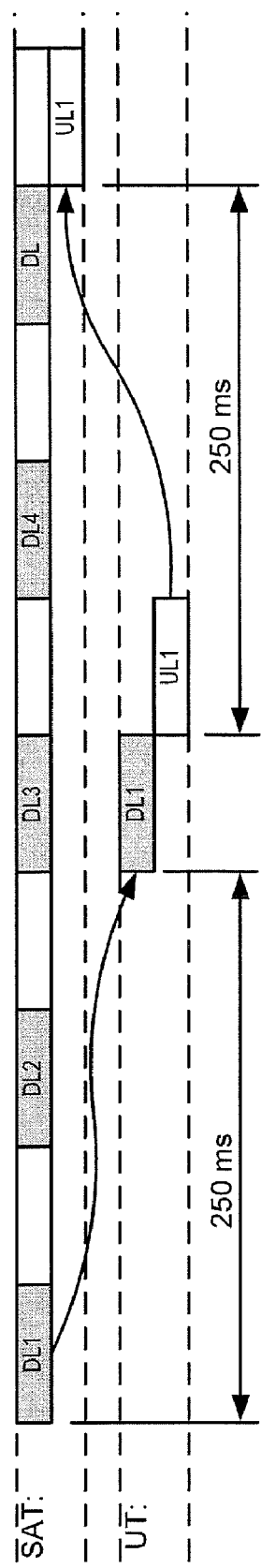

FIG. 5A shows uplink and downlink frame synchronization for terminals with a mean propagation delay of 250 ms. In particular, FIG. 5A depicts uplink and downlink communication between a satellite/earth station (SAT) and a user terminal (UT) located at a position corresponding to the mean propagation delay. In this case, downlink and uplink frames are fully synchronized at both the satellite and the user terminal.

Figure 5B:
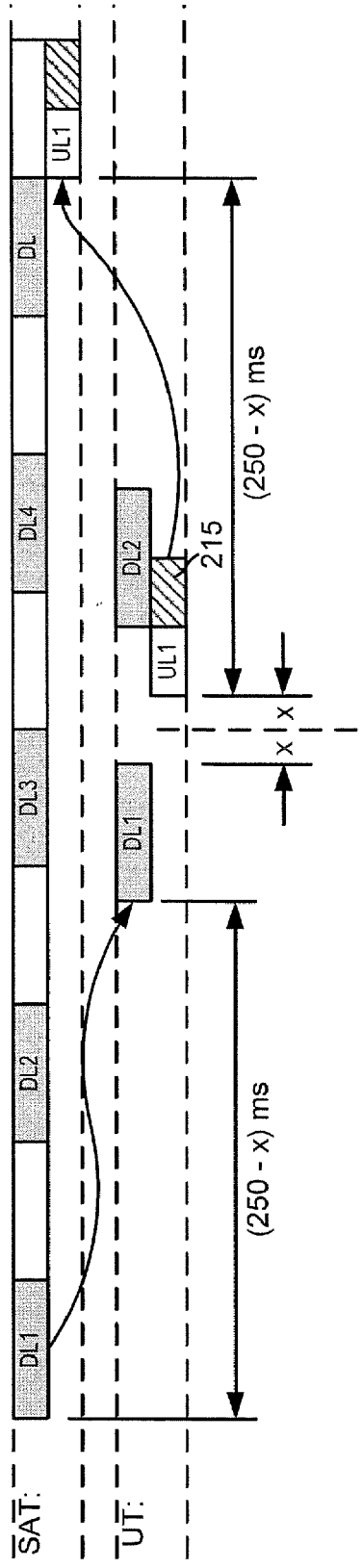

FIG. 5B shows how transmission of the uplink subframe is retarded for user terminals with propagation delays smaller than the mean propagation delay, in order to synchronize the frames at the satellite/earth station. In particular, the user terminal UT has a propagation delay of (250−x) that is x milliseconds shorter than the mean propagation delay (i.e. having a differential propagation delay of −x milliseconds relative to the mean propagation delay). The user terminal will therefore receive the downlink subframes x milliseconds earlier than a user terminal with the mean propagation delay. On the other hand, it will transmit its uplink subframes x milliseconds later than user terminals with the mean propagation delay in order to ensure that the uplink subframes are synchronized at the satellite/earth station. Under these conditions (downlink subframes received in advance and uplink subframes delayed) the two subframes will overlap. A guard time 215 is provided at the end of the uplink subframe UL1 in order to avoid overlapping with the downlink subframe DL2. The duration of the guard time 215 may be twice the magnitude of the differential delay (i.e., |2x|).

Figure 5C:
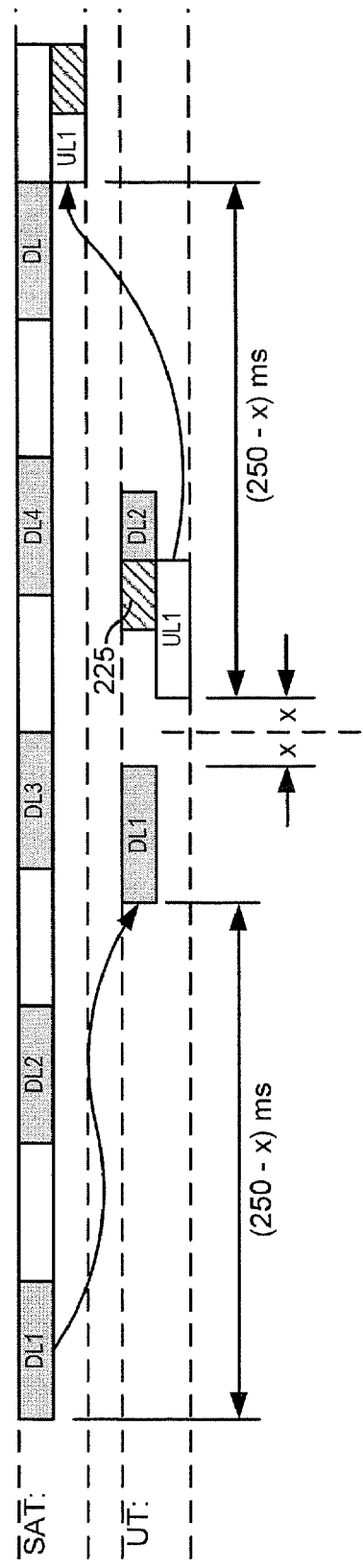

As shown in FIG. 5C, instead of or in addition to adding a guard time 215 at the end of the uplink frame UL1, a guard time 225 may be added at the beginning of the downlink subframe DL2.

FIG. 5D shows how a downlink subframe transmission is advanced for user terminals with propagation delays larger than the mean propagation delay, in order to synchronize the frames at the satellite/earth station. In particular, FIG. 5C depicts a user terminal UT located at a position characterized by a propagation delay that is x milliseconds longer than the mean propagation delay (i.e. having a differential propagation delay of x milliseconds relative to the mean propagation delay). The user terminal UT will receive the downlink subframes later, but it will transmit the uplink subframes earlier than terminals with the mean propagation delay. In these conditions, a guard time 235 is added at the end of the downlink subframe DL1 to avoid the overlapping with the uplink subframe UL1. The duration of the guard time 235 will be twice the magnitude of the differential delay (i.e., |2x|).

As shown in FIG. 5E, instead of or in addition to adding a guard time 235 at the end of the downlink frame DL1, a guard time 245 may be added at the beginning of the uplink subframe UL1.

Guard times may be added the beginning and/or end of the downlink and/or uplink subframes, and/or allocated between the downlink and uplink subframes, depending on the relative amount of bandwidth required for uplink versus downlink transmissions. For example, some applications, such as voice telephony, may require relatively symmetric data rates between uplink and downlink transmission. In such cases, it may be desirable to allocate guard times to both the uplink and downlink subframes. However, other applications such as internet browsing and content distribution (e.g. broadcast or multicast distribution) may require larger data rates for downlink communication than for uplink communication. In such cases, it may be desirable to add guard times to the uplink subframes only, to avoid reducing the available downlink bandwidth.

The appropriate guard times 210, 215 may be determined by the resource scheduler in the satellite/earth station in response to determining the propagation delay for a terminal, and may be transmitted to the terminal by the satellite/earth station.

Further embodiments of the invention provide systems/methods for synchronizing the arrival epoch of all sets of tones of an OFDMA channel arriving from disparate user terminals at an earth station via a satellite. Some embodiments of these techniques, which employ ranging, are illustrated in FIGS. 6A-6B and 7.

Figure 6A:
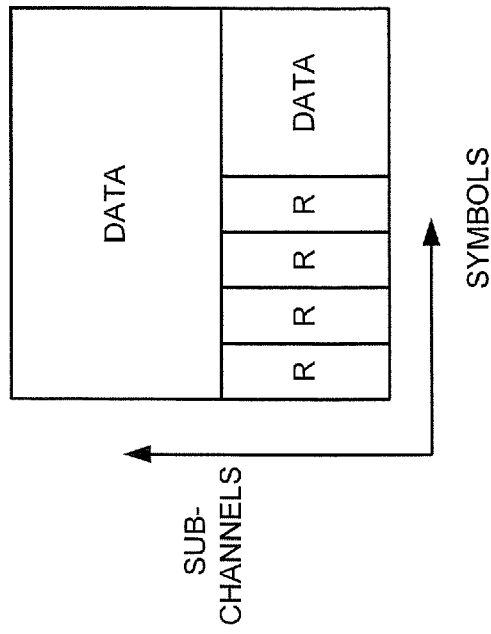
FIG. 6A illustrates allocation of subchannels/symbols to a ranging codeword according to some embodiments of the invention.
Figure 5G:
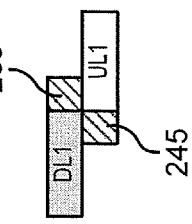
Figure 5F:
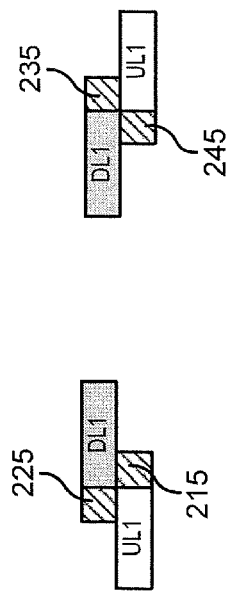
Figure 6B:
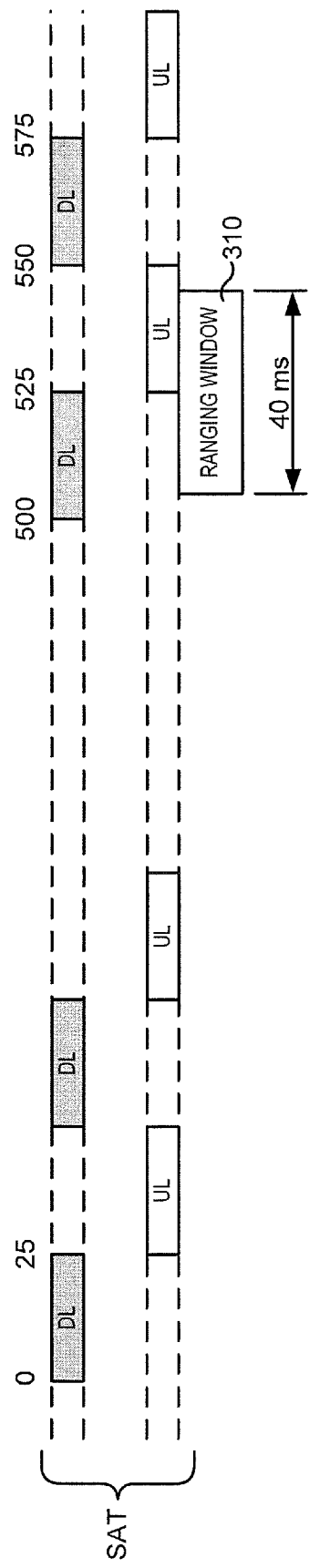
FIG. 6B illustrates a ranging window used at a satellite/earth station according to some embodiments of the invention.
Figure 7:
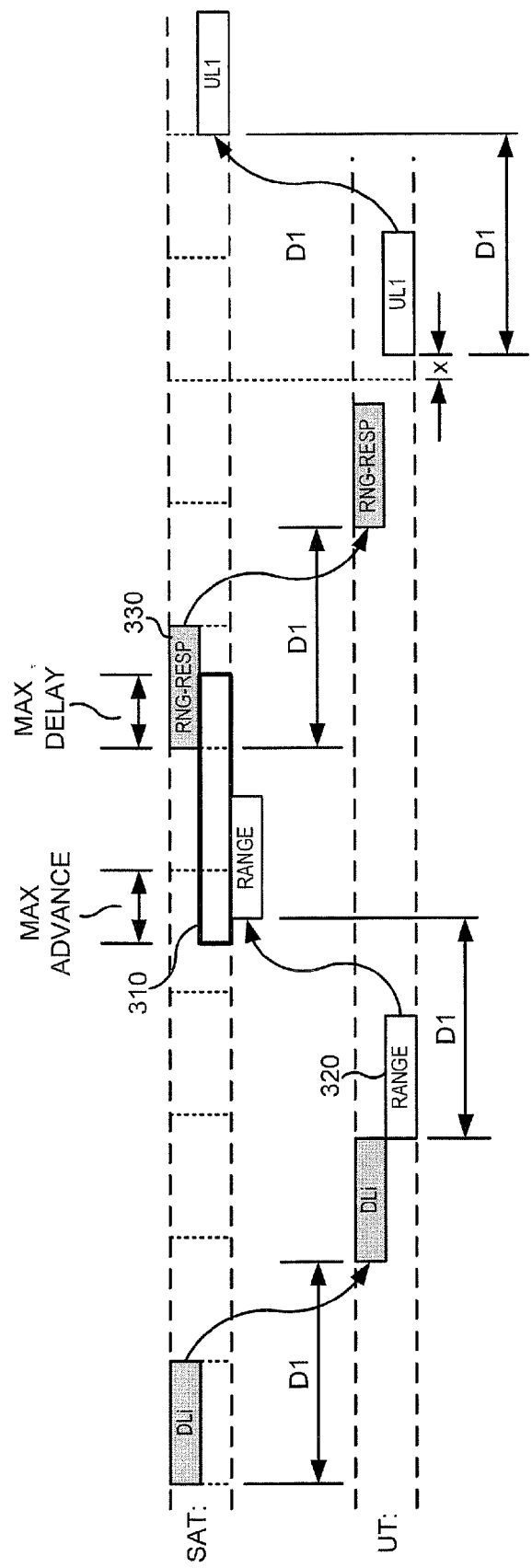
FIG. 7 illustrates ranging operations according to some embodiments of the invention.

FIG. 6A shows a ranging channel structure for satellite applications and FIG. 6B illustrates a ranging channel window according to some embodiments of the invention, which is larger than the frame size to accommodate large differential delays common in satellite channels. In particular, referring to FIG. 6A, a ranging codeword R may embedded as a part of an uplink data frame, and may occupy a number of tones/subchannels across a number of symbols to account for bandwidth constraints in satellite communications systems.

Referring to FIG. 6B, a relatively large ranging window 310 may be provided at the satellite/earth station due to the increased differential delays. In particular, a ranging window 310 may be provided to allow the ranging channel codeword to be received by the satellite/earth station during a sufficiently large window. For example, the ranging window 310 may have a duration Trw given as:

$$Trw = T\text{subframe} + 2|T\text{max}dd| \quad (1)$$

where Tsubframe is the duration of an uplink subframe and Tmaxdd is the maximum expected differential delay, so that the ranging window 310 is sized to tolerate ranging codewords that are advanced or retarded by up to a maximum differential delay Tmaxdd. In some embodiments, a ranging window of at least about 40 ms may be provided, as depicted in FIG. 6B.

FIG. 7 shows ranging operations in a satellite network according to some embodiments of the invention. As shown therein, a satellite transmits a downlink subframe DL1. In response, the user terminal transmits a ranging subframe 320, which is received by the satellite/earth station after a propagation delay D1 associated with the user terminal. Without ranging, an uplink frame would arrive at a random or unknown epoch. However, the arrival time of the ranging uplink frame 320 is within the ranging window 310, which is sized to extend longer than a subframe by at least a maximum advance time on one end and a maximum delay time on the other. In the example illustrated in FIG. 7, the propagation delay D1 associated with the user terminal is less than the average delay, so that the ranging subframe 320 is received slightly ahead of time, but still within the ranging window 310. Thus, the satellite/earth station is able to respond to the ranging request with a ranging response 330. The ranging response may designate a timing delay x for use by the user terminal in synchronizing uplink transmissions. Accordingly, the user terminal receives the ranging response 330 and uses timing information contained therein to advance or delay its transmission time. The next uplink subframe UL1 is thereby synchronized at the satellite/earth station. The ranging response may also designate guardband(s) to be used on the uplink and/or downlink frames and/or may designate one or more subregions as unused to avoid overlaps between uplink and downlink frames at the user terminal, as described above.

Accordingly, as described above, according to some embodiments of the invention, in an Orthogonal Frequency Division Multiple Access (OFDMA) system, the entire bandwidth is divided into orthogonal tones, and each user is allocated a set of these tones for use in communicating with the base station. In a satellite system operating OFDMA, due to power and bandwidth constraints, the allocated set may be limited to a small number of tones.

This allocation of resources, both on the downlink (earth station to user terminal) and uplink (user terminal to earth station) may be performed by a resource scheduler at the satellite/earth station based on pre-defined downlink and uplink data frames. In a satellite system operating OFDMA over a Half Frequency Division Duplexing Mode (HFDD), the propagation delay between the earth station and the user terminal may be much larger than the frame duration. The large propagation delay and the potentially large differential delay between any two user terminals accessing the same frequency band (spot beam) may render the reception of the uplink frame out of synchronization and overlapped with the downlink frame at the user terminal. In some embodiments, an uplink resource allocation to a user terminal may be made in those portions of the uplink frame that do not overlap with the downlink frame, as determined by the terminal's differential delay. Alternatively, the terminals can advance or retard the transmission of the uplink frames by some guard time based on the intra-beam differential delay for that terminal relative to the mean delay.

On the uplink, the apparatus at the satellite/earth station may provide that that all sets of tones from the various users corresponding to a particular sequence number be received at the satellite/earth station at the same epoch. This may be achieved through a ranging process, whereby the satellite/earth station determines the relative signal propagation delays for each user terminal and commands them to advance or retard their transmission epochs accordingly. In bandwidth constrained satellite systems, the code word used for ranging may be spread over a larger time period/number of symbols as compared to high bandwidth terrestrial networks. In addition, to account for the increased differential delays, a sufficiently large ranging window may be provided that takes into account the maximum differential propagation delays that may be expected.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method for controlling orthogonal frequency division multiple access (OFDMA) communications over satellite links, comprising:
   estimating a differential delay in a satellite spotbeam between a mean propagation delay in the spotbeam and a propagation delay between a user terminal in the spotbeam and a satellite;
   estimating an overlap between an OFDMA uplink frame and an OFDMA downlink frame as a result of the differential delay; and
   providing a guard band in the OFDMA uplink frame and/or the OFDMA downlink frame to reduce an overlap between remaining portions of the OFDMA uplink frame and the OFDMA downlink frame other than the guard band.

2. The method of claim 1, wherein the guard band has a duration that is at least twice the differential delay.

3. The method of claim 1, wherein the propagation delay between the user terminal and the satellite is less than the mean propagation delay, and wherein providing the guard band comprises providing the guard band at an end portion of the OFDMA uplink frame and/or at a beginning portion of the OFDMA downlink frame.

4. The method of claim 3, wherein providing the guard band comprises providing a first guard band at the end portion of the OFDMA uplink frame and providing a second guard band at the beginning portion of the OFDMA downlink frame.

5. The method of claim 4, wherein the first guard band and the second guard band have a total duration that is at least twice the differential delay.

6. The method of claim 1, wherein the propagation delay between the user terminal and the satellite is greater than the mean propagation delay, and wherein providing the guard band comprises providing the guard band at a beginning portion of the OFDMA uplink frame and/or at an end portion of the OFDMA downlink frame.

7. The method of claim 6, wherein providing the guard band comprises providing a first guard band at the beginning portion of the OFDMA uplink frame and providing a second guard band at the end portion of the OFDMA downlink frame.

8. The method of claim 7, wherein the first guard band and the second guard band have a total duration that is at least twice the differential delay.

9. The method of claim 1, wherein the OFDMA uplink frame comprises a plurality of subregions, and wherein providing a guard band in the OFDMA uplink frame comprises designating at least one of the plurality of subregions as unused.

10. The method of claim 9, wherein a subregion comprises a plurality of symbols in an OFDMA subchannel, and wherein the subregion includes at least one pilot symbol.

11. The method of claim 10, wherein the subregion includes at least two data symbols.

12. The method of claim 9, wherein the propagation delay between the user terminal and the satellite is less than the mean propagation delay, and wherein providing the guard band comprises designating at least one subregion at an end portion of the OFDMA uplink frame and/or at a beginning portion of the OFDMA downlink frame as unused.

13. The method of claim 12, wherein providing the guard band comprises designating at least one subregion at the end portion of the OFDMA uplink frame and at least one subregion at the beginning portion of the OFDMA downlink frame as unused.

14. The method of claim 9, wherein the propagation delay between the user terminal and the satellite is greater than the mean propagation delay, and wherein providing the guard band comprises designating at least one subregion at a beginning portion of the OFDMA uplink frame and/or at an end portion of the OFDMA downlink frame as unused.

15. The method of claim 14, wherein providing the guard band comprises designating at least one subregion at the beginning portion of the OFDMA uplink frame and at least one subregion at the end portion of the OFDMA downlink frame as unused.

16. The method of claim 1, wherein estimating the differential delay comprises defining a ranging window that has a duration of at least a duration of an OFDMA uplink frame plus twice a maximum expected differential delay for OFDMA uplink frames, and receiving a ranging codeword within the ranging window.

17. The method of claim 16, wherein the ranging codeword comprises a plurality of ranging symbols.

18. The method of claim 17, wherein the ranging codeword is spread over a plurality of OFDMA subchannels.

19. The method of claim 16, further comprising transmitting a ranging response in response to the ranging code word, wherein the ranging response designates a timing delay for use in synchronizing uplink transmissions.

20. The method of claim 19, wherein the ranging response designates guardband(s) to be used on uplink and/or OFDMA downlink frames and/or designates at least one subregion of an OFDMA uplink frame and/or an OFDMA downlink frame as unused.

21. A system for controlling orthogonal frequency division multiple access (OFDMA) communications over satellite links, comprising:
a satellite;
a user terminal configured to communicate with the satellite via a satellite frequency over one of the satellite links,
a scheduler configured to estimate a differential delay in a satellite spotbeam between a mean propagation delay in the spotbeam and a propagation delay between the user terminal in the spotbeam and the satellite, configured to estimate an overlap between an OFDMA uplink frame and an OFDMA downlink frame as a result of the differential delay, and configured to provide a guard band in the OFDMA uplink frame and/or the OFDMA downlink frame to reduce an overlap at the user terminal between remaining portions of the OFDMA uplink frame and the OFDMA downlink frame other than the guard band.

22. The system of claim 21, wherein the guard band has a duration that is at least twice the differential delay.

23. The system of claim 21, wherein the propagation delay between the user terminal and the satellite is less than the mean propagation delay, and wherein the scheduler is configured to provide the guard band at an end portion of the OFDMA uplink frame and/or at a beginning portion of the OFDMA downlink frame.

24. The system of claim 23, wherein the scheduler is configured to provide a first guard band at the end portion of the OFDMA uplink frame and a second guard band at the beginning portion of the OFDMA downlink frame.

25. The system of claim 24, wherein the first guard band and the second guard band have a total duration that is at least twice the differential delay.

26. The system of claim 21, wherein the propagation delay between the user terminal and the satellite is greater than the mean propagation delay, and wherein the scheduler is configured to provide the guard band at a beginning portion of the OFDMA uplink frame and/or at an end portion of the OFDMA downlink frame.

27. The system of claim 26, wherein the scheduler is configured to provide a first guard band at the beginning portion of the OFDMA uplink frame and a second guard band at the end portion of the OFDMA downlink frame.

28. The system of claim 27, wherein the first guard band and the second guard band have a total duration that is at least twice the differential delay.

29. The system of claim 21, wherein the OFDMA uplink frame comprises a plurality of subregions, and wherein the scheduler is configured to designate at least one of the plurality of subregions as unused.

30. The system of claim 29, wherein a subregion comprises a plurality of symbols in an OFDMA subchannel, and wherein the subregion includes at least one pilot symbol.

31. The system of claim 30, wherein the subregion includes at least two data symbols.

32. The system of claim 29, wherein the propagation delay between the user terminal and the satellite is less than the mean propagation delay, and wherein the scheduler is configured to designate at least one subregion at an end portion of the OFDMA uplink frame and/or at a beginning portion of the OFDMA downlink frame as unused.

33. The system of claim 32, wherein the scheduler is configured to designate at least one subregion at the end portion of the OFDMA uplink frame and at least one subregion at the beginning portion of the OFDMA downlink frame as unused.

34. The system of claim 29, wherein the propagation delay between the user terminal and the satellite is greater than the mean propagation delay, and wherein the scheduler is configured to designate at least one subregion at a beginning portion of the OFDMA uplink frame and/or at an end portion of the OFDMA downlink frame as unused.

35. The system of claim 34, wherein the scheduler is configured to designate at least one subregion at the beginning portion of the OFDMA uplink frame and at least one subregion at the end portion of the OFDMA downlink frame as unused.

36. The system of claim 21, wherein the scheduler is configured to estimate the differential delay by defining a ranging window that has a duration of at least a duration of an OFDMA uplink frame plus twice a maximum expected differential delay for OFDMA uplink frames, and receiving a ranging codeword within the ranging window.

37. The system of claim 36, wherein the ranging codeword comprises a plurality of ranging symbols.

38. The system of claim 37, wherein the ranging codeword is spread over a plurality of OFDMA subchannels.

39. The system of claim 36, wherein the scheduler is configured to cause the satellite to transmit a ranging response in response to the ranging code word, wherein the ranging response designates a timing delay for use in synchronizing uplink transmissions.

40. The system of claim 39, wherein the ranging response designates guardband(s) to be used on uplink and/or OFDMA downlink frames and/or designates at least one subregion of an OFDMA uplink frame and/or an OFDMA downlink frame as unused.

41. A scheduler for controlling orthogonal frequency division multiple access (OFDMA) communications over satellite links between a satellite and a user terminal, wherein the scheduler is configured to estimate a differential delay in a satellite spotbeam between a mean propagation delay in the spotbeam and a propagation delay between the user terminal in the spotbeam and the satellite, configured to estimate an overlap between an OFDMA uplink frame and an OFDMA downlink frame as a result of the differential delay, and configured to provide a guard band in the OFDMA uplink frame and/or the OFDMA downlink frame to reduce an overlap at the user terminal between remaining portions of the OFDMA uplink frame and the OFDMA downlink frame other than the guard band.

42. The scheduler of claim 41, wherein the guard band has a duration that is at least twice the differential delay.

43. The scheduler of claim 41, wherein the propagation delay between the user terminal and the satellite is less than the mean propagation delay, and wherein the scheduler is configured to provide the guard band at an end portion of the OFDMA uplink frame and/or at a beginning portion of the OFDMA downlink frame.

44. The scheduler of claim 43, wherein the scheduler is configured to provide a first guard band at the end portion of the OFDMA uplink frame and a second guard band at the beginning portion of the OFDMA downlink frame.

45. The scheduler of claim 44, wherein the first guard band and the second guard band have a total duration that is at least twice the differential delay.

46. The scheduler of claim 41, wherein the propagation delay between the user terminal and the satellite is greater than the mean propagation delay, and wherein the scheduler is configured to provide the guard band at a beginning portion of the OFDMA uplink frame and/or at an end portion of the OFDMA downlink frame.

47. The scheduler of claim 46, wherein the scheduler is configured to provide a first guard band at the beginning portion of the OFDMA uplink frame and a second guard band at the end portion of the OFDMA downlink frame.

48. The scheduler of claim 47, wherein the first guard band and the second guard band have a total duration that is at least twice the differential delay.

49. The scheduler of claim 41, wherein the OFDMA uplink frame comprises a plurality of subregions, and wherein the scheduler is configured to designate at least one of the plurality of subregions as unused.

50. The scheduler of claim 49, wherein a subregion comprises a plurality of symbols in an OFDMA subchannel, and wherein the subregion includes at least one pilot symbol.

51. The scheduler of claim 50, wherein the subregion includes at least two data symbols.

52. The scheduler of claim 49, wherein the propagation delay between the user terminal and the satellite is less than the mean propagation delay, and wherein the scheduler is configured to designate at least one subregion at an end portion of the OFDMA uplink frame and/or at a beginning portion of the OFDMA downlink frame as unused.

53. The scheduler of claim 52, wherein the scheduler is configured to designate at least one subregion at the end portion of the OFDMA uplink frame and at least one subregion at the beginning portion of the OFDMA downlink frame as unused.

54. The scheduler of claim 49, wherein the propagation delay between the user terminal and the satellite is greater than the mean propagation delay, and wherein the scheduler is configured to designate at least one subregion at a beginning portion of the OFDMA uplink frame and/or at an end portion of the OFDMA downlink frame as unused.

55. The scheduler of claim 54, wherein the scheduler is configured to designate at least one subregion at the beginning portion of the OFDMA uplink frame and at least one subregion at the end portion of the OFDMA downlink frame as unused.

56. The scheduler of claim 51, wherein the scheduler is configured to estimate the differential delay by defining a ranging window that has a duration of at least a duration of an OFDMA uplink frame plus twice a maximum expected differential delay for OFDMA uplink frames, and receiving a ranging codeword within the ranging window.

57. The scheduler of claim 56, wherein the ranging codeword comprises a plurality of ranging symbols.

58. The scheduler of claim 57, wherein the ranging codeword is spread over a plurality of OFDMA subchannels.

59. The scheduler of claim 56, wherein the scheduler is configured to cause the satellite to transmit a ranging response in response to the ranging code word, wherein the ranging response designates a timing delay for use in synchronizing uplink transmissions.

60. The scheduler of claim 59, wherein the ranging response designates guardband(s) to be used on uplink and/or OFDMA downlink frames and/or designates at least one subregion of an OFDMA uplink frame and/or an OFDMA downlink frame as unused.

61. A radioterminal configured to communicate with a satellite using orthogonal frequency division multiple access (OFDMA) communications, wherein the radioterminal is configured to receive a designation of a guardband to be used for an OFDMA uplink frame transmitted by the radioterminal to the satellite, and wherein the radioterminal is configured not to transmit OFDMA signals during the uplink guardband so as to reduce an overlap between the OFDMA uplink frame mad an OFDMA downlink frame; wherein the guard band has a duration that is at least twice a differential delay in a satellite spotbeam between a mean propagation delay in the spotbeam and a propagation delay between the radioterminal and the satellite.

62. The radioterminal of claim 61, wherein a propagation delay between the radioterminal and the satellite is less than the mean propagation delay, and wherein the guard band is provided at an end portion of the OFDMA uplink frame.

63. The radioterminal of claim 61, wherein the propagation delay between the radioterminal and the satellite is greater than the mean propagation delay, and wherein the guard band is provided at a beginning portion of the OFDMA uplink frame.

64. The radioterminal of claim 61, wherein the OFDMA uplink frame comprises a plurality of subregions, and wherein at least one of the plurality of subregions is unused by the radioterminal.

65. The radioterminal of claim 64, wherein a subregion comprises a plurality of symbols in an OFDMA subchannel, and wherein the subregion includes at least one pilot symbol.

66. The radioterminal of claim 65, wherein the subregion includes at least two data symbols.

67. The radioterminal of claim 64, wherein the propagation delay between the radioterminal and the satellite is less than the mean propagation delay, and wherein at least one subregion at an end portion of the OFDMA uplink frame is unused.

68. The radioterminal of claim 64, wherein the propagation delay between the radioterminal and the satellite is greater than the mean propagation delay, and wherein at least one subregion at a beginning portion of the OFDMA uplink frame is unused.

* * * * *

UNITED STATES PATENT AND TRADEMARK OFFICE
CERTIFICATE OF CORRECTION

PATENT NO.        : 8,169,955 B2
APPLICATION NO.   : 11/759549
DATED             : May 1, 2012
INVENTOR(S)       : Ansari et al.

It is certified that error appears in the above-identified patent and that said Letters Patent is hereby corrected as shown below:

Column 16, Claim 21, Line 20: Correct "links," to read -- links; --

Column 19, Claim 61, Line 12: Correct "mad an OFDMA"
                                      to read -- and an OFDMA --

Signed and Sealed this
Twentieth Day of November, 2012

David J. Kappos
*Director of the United States Patent and Trademark Office*